United States Patent [19]

Hoppie

[11] Patent Number: 4,691,682
[45] Date of Patent: Sep. 8, 1987

[54] METHOD AND APPARATUS FOR MAXIMIZING INTERNAL COMBUSTION ENGINE WORK OUTPUT BY CONTROLLED HEAT RELEASE

[75] Inventor: Lyle O. Hoppie, Birmingham, Mich.

[73] Assignee: Eaton Corporation, Cleveland, Ohio

[21] Appl. No.: 825,281

[22] Filed: Feb. 3, 1986

[51] Int. Cl.⁴ .............................. F02M 31/04
[52] U.S. Cl. ........................ 123/558; 123/551
[58] Field of Search ............ 123/48 D, 78 D, 286, 123/543, 550, 551, 554, 90.16

[56] References Cited

U.S. PATENT DOCUMENTS

| | | | |
|---|---|---|---|
| 2,614,546 | 10/1952 | Schwarz | 123/48 D |
| 4,074,661 | 2/1978 | Noguchi et al. | 123/551 X |
| 4,202,300 | 5/1980 | Skay | 123/48 D X |
| 4,258,671 | 3/1981 | Takizawa et al. | 123/90.16 |
| 4,448,176 | 5/1984 | Hoppie | 123/558 |
| 4,572,116 | 2/1986 | Hedelin | 123/78 D |

FOREIGN PATENT DOCUMENTS 7808110  2/1980  Netherlands ............. 123/48 D

OTHER PUBLICATIONS

Scharnweber et al., "Hypergolic Combustion in an Internal Combustion Engine", *Society of Automotive Engineers*, Mar. 1, 1985.
H. J. Henkel et al., "Autothermal Gasification of Liquid Hydro Carbons by Partial Oxidation", (Siemen Forsch.-u Entiwikl Berlin) Jul. 1977.
G. P. Purohit et al., "Gasification of Diesel Fuel for a Low-Emission, High-Efficiency Engine System", *Society of Automotive Engineers*, Jan., 1980.
W. Frie et al., "Compact Gas Generator for Fuel Gasification Aboard Motor Vehicles", (Siemens AG Forschungslaboratorien, Berlin) Jul., 1978.

*Primary Examiner*—Willis R. Wolfe, Jr.
*Attorney, Agent, or Firm*—J. Gordon Lewis; John R. Benefiel

[57] ABSTRACT

A method and apparatus are disclosed for controlling the rate and timing of heat released during each combustion cycle of an internal combustion engine so as to maximize the net work output of the engine. Mathematical expressions of engine loss factors, such as friction and heat transfer, are used to establish a combustion chamber pressure versus crank angle function which is analyzed together with a combustion chamber pressure versus crank angle function in the absence of combustion. From this analysis, a derivation of optimized combustion chamber heat release rate and timing is enabled. The optimized combustion chamber heat release rate and timing are achieved by controlling the timing and rate of injection of fuel into the combustion chamber, which fuel has been activated by pretreatment so to enable "hypergolic" or instantaneous combustion upon injection.

11 Claims, 7 Drawing Figures

METHOD AND APPARATUS FOR MAXIMIZING INTERNAL COMBUSTION ENGINE WORK OUTPUT BY CONTROLLED HEAT RELEASE

BACKGROUND OF THE INVENTION

1. Field of the Invention

This invention concerns internal combustion engines, and more particularly internal combustion engines having cyclical episodes of combustion in a combustion chamber. Typical of these is the very well known reciprocating piston engine in which a crank mounted piston reciprocates in a cylinder, the end face of the piston together with internal surfaces of the cylinder and its head defining a combustion chamber. However, conventional combustion technology has generally not enabled any significant control over the combustion event in such reciprocating piston internal combustion engines.

2. Description of the Prior Art

In a spark-ignited version of such an engine, a fuel-air charge is formed in the combustion chamber during each cycle, and is ignited and burned to create high pressure gases, which in expanding, drive the piston to create mechanical work output. The charge is typically ignited at a specific locale by a spark plug, and combustion propagates through the remainder of the charge at a rate governed primarily by the air-fuel ratio and by the temperature and pressure of the charge when combustion is initiated.

It is well known that the air-fuel ratio, as well as the temperature and pressure of the charge, must be held to within rather narrow ranges, or the performance of the engine will deteriorate. Consequently, it is known that the beginning, ending, and intensity of combustion can not be controlled in such engines. It is also known that combustion is typically initiated with the spark plug well before the reciprocating piston has fully compressed the fuel-air charge, reflecting the fact that combustion propagates more slowly than desired. Specifically, if combustion is initiated of a time significantly after the piston has fully compressed the fuel-air charge, the combustion process would be far from complete at the time opening of the exhaust values occurs.

In diesel cycle engines, fuel is injected into a highly compressed air charge, the air charge heated by compression to a temperature elevated sufficiently to ensure ignition of the fuel upon injection. Ignition lag delays the ignition and combustion of the fuel such that complete control over the combustion event has not been achieved. Again, heat release is usually initiated prior to full compression of the air to allow sufficient time for combustion.

Since the heat release profiles of both spark-ignited and compression-heated engines have heretofore primarily been governed by such factors as flame speed, evaporation rate, etc., it has not been possible to significantly alter the heat release profile in an attempt to improve engine efficiency. Consequently, efforts aimed at seeking the optimum heat release profile for a particular engine have been nil.

It has heretofore been proposed to achieve so called "hypergolic" combustion, particularly of hydrocarbon fuels in an internal combustion engine, such that ignition delay and the time required to complete combustion are both negligible after the fuel is introduced into an oxidizing atmosphere.

For a detailed discussion, see U.S. Pat. No. 4,448,176; SAE paper no. 850089 "Hypergolic Combustion in an Internal Combustion Engine"; and, SAE paper 820356, "The Influence of Initial Fuel Temperature of Ignition Delay"; each of which are incorporated herein by reference.

As also detailed in the aforementioned references, ignition delay is believed to occur due to the need for the fuel molecules to first be dissassociated into radicals in order to combine with oxygen molecules, which themselves must be dissassociated for oxidation to occur. In a typical combustion process, an ignition device such as a spark plug causes a localized increased concentration of fuel and oxygen radicals in a fuel-air mixture, sufficient for initiation of combustion. The release of heat from that localized combustion in turn causes additional dissassociation of adjacent fuel and oxygen molecules to enable combustion to propagate through the entire charge of fuel-air mixture.

As discussed in the aforementioned U.S. Pat. No. 4,448,176, if there is a pretreatment of the fuel such as to cause a dissassociation of a critical proportion of molecules in each quantity of fuel, much higher than the proportion occurring at ambient temperatures, there is an "activation" of the fuel yielding substantially instantaneous ignition and combustion.

In order that such an increased, critical proportion of fuel molecules be dissassociated into radicals, energy must be expended to bring this proportion of the fuel molecules to the relatively high energy state corresponding to the dissassociated condition of the fuel molecules.

As described in the aforementioned U.S. Pat. No. 4,448,176, if fuel is heated to relatively elevated temperatures in excess of 1000° F., this causes such critical proportion of fuel molecules to be dissassociated to form radicals, since such proportion of the fuel molecules is thereby brought to a high energy state.

In co-pending application Ser. No. 812,863 filed on Dec. 26, 1985, there is described a method and system for heating of the fuel to such elevated temperatures by a regenerative heat exchange process, in which the fuel is circulated through a vessel disposed directly in the combustion chamber, with the combustion chamber insulated to retain heat therein. This arrangement, when combined with preheating of the fuel, as with a heat exchanger in the engine exhaust system, is able to heat the fuel to such sufficiently elevated temperatures, that upon injection into the combustion chamber hypergolic combustion will result.

Alternatively, catalysis is utilized to augment the effect of heating to achieve fuel activation.

A disadvantage of regeneratively heating the fuel is the tendency for cracking of the fuel molecules at high temperatures, and the resultant formation of coke, tending to clog the fuel flow passages. It has been discovered that if the fuel is sustained at the elevated temperatures for only very short time periods, this will avoid this problem.

Also, while such aforementioned regenerative heating method and system will efficiently heat the fuel to such elevated temperatures, a relatively complex fuel circulation system is necessitated and the tendency for coke formation is higher due to the longer times required to achieve heating by heat exchange with the products of combustion produced in prior combustion cycles.

In co-pending application Ser. No. 813,888 filed on Dec. 26, 1985, now U.S. Pat. No. 4,644,925, a method of compressive heating of vaporized fuel is disclosed to achieve activated fuel enabling hypergolic combustion, in which catalysis is alternatively utilized to augment the effect achieved by compression heating alone.

Another method of pretreatment of fuel is disclosed in Ser. No. 446,796, filed on Dec. 3, 1982, now U.S. Pat. No. 4,582,475, in which a corona discharge is utilized to activate fuel passed therethrough prior to combustion, to achieve activation of the fuel molecules by the formation of radicals.

There has also been disclosed in co-pending application Ser. No. 813,892 filed on Dec. 26, 1985, a method of activating fuel by irradiation with ultraviolet radiation to achieve the level of activation of the fuel enabling hypergolic combustion.

In SAE paper 800264 entitled "Gasification of Diesel Fuel for a Low Emission, High Efficiency Engine System"; in Siemens Forsch.-u. Entwickl.-Ber.Bd.6 (1977) Nr. 5, entitled "Autothermal Gasification of Liquid Hydrocarbons by Partial Oxidation"; and Siemens Forsch.-u. Entwickl.-Ber.Bd.7 (1978) Nr.2 entitled "Compact Gas Generator for Fuel Gasification Aboard Motor Vehicles," each of which are hereby incorporated by reference, there is disclosed a method of gasifying liquid hydrocarbon fuels.

In co-pending application Ser. No. 813,882 filed on Dec. 26, 1985, now U.S. Pat. No. 4,651,703, there is disclosed a method and apparatus for activating fuel using such partial catalytic combustion.

Such hypergolic combustion raises the possibility of achieving control over the combustion process such as to precisely control the rate and timing of heat release during a combustion cycle.

It is an object of the present invention to control the combustion event in an internal combustion engine so as to achieve maximized net work ouput from an internal combustion engine, utilizing activated fuel capable of being hypergolically combusted when introduced into a combustion chamber at a rate and over a timed interval predetermined to produce the maximized net work output from the engine.

SUMMARY OF THE INVENTION

This and other objects of the present invention are achieved by taking into account the effects of energy loss factors such as friction and heat loss during the combustion cycles on the optimal rate and timing of heat release for maximizing the net work output of the engine.

Such determination of the proper timing and rate of heat release may be advantageously accomplished by empirically or otherwise deriving work loss factor functions, and also developing a function relating work output in the engine to the rate and timing of heat release. Such functions may be collectively analyzed by using such mathematical techniques as the calculus of variations to arrive at a rate and timing of heat release which will achieve a maximized net work output of the engine for a given heat input over each engine cycle.

The fuel is activated by any of various pretreatments but preferably by partial catalytic combustion and is controllably introduced into the engine combustion chamber to achieve the predetermined optimal rate and timing of heat release for maximized net work output.

DETAILED DESCRIPTION

Figure 1:
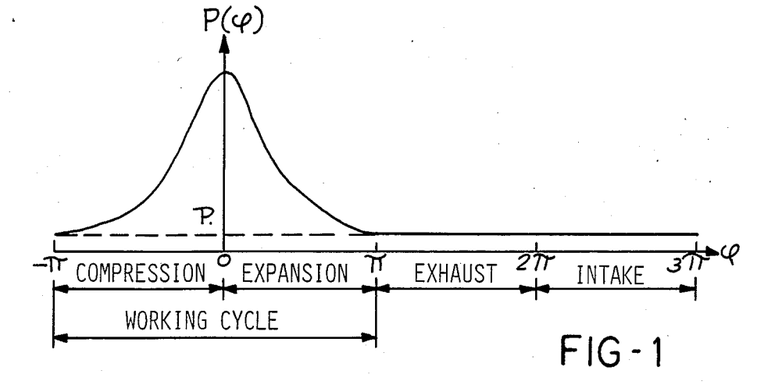
FIG. 1 is a pressure-crank angle plot of a no loss piston engine in the absence of any heat release during a cycle of piston movement.

FIG. 1 shows a pressure (P) vs crank angle ($\phi$) expressed in radians for a hypothetical lossless reciprocating engine when no heat is released at any time during the complete cycle beginning at $\phi = -\pi$ and ending at $\phi = 3\pi$; the P($\phi$) curve is assumed to be cyclically repetitive, though only one complete cycle is shown.

Figure 2:
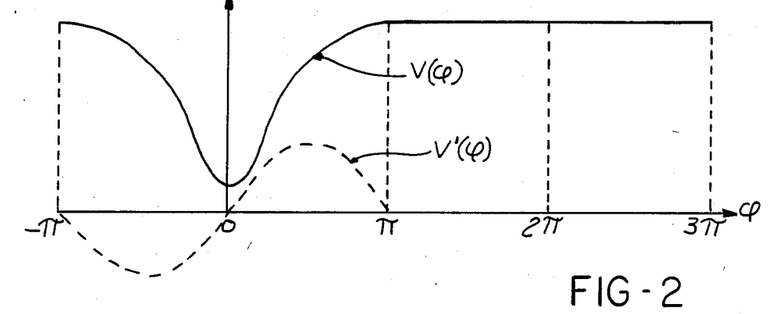
FIG. 2 is a plot of specific volume and rate of change of specific volume as a function of crank angle.

In FIG. 2, the volume per-unit mass of working substance, V($\phi$), and the rate of change of V($\phi$) with respect to $\phi$, V'($\phi$), are shown for one complete cycle. As is well known by those skilled in the art, the exact mathematical expressions for V($\phi$) and V'($\phi$) are specified by various geometrical parameters of the engine, as detailed, for example, in *Internal Combustion Engines and Air Pollution* by E. F. Obert. As is also well known, in the absence of all losses, and if no heat is added during the cycle, P($\phi$) and V($\phi$) are related by well known expression:

$$P(\phi)V^k(\phi) = P_o V_o^k \qquad (1)$$

where the values $P_o$ and $V_o$ are indicated on FIGS. 1 and 2, and where $$k = \frac{c_p}{c_v} \qquad (2)$$

is the ratio of specific heats of the working media, usually air.

Now assume that heat produced by the combustion of fuel is to be released during the working cycle, i.e., between $\phi = -\pi$ and $\phi = \pi$ as indicated in FIG. 1. In particular, assume that the release of heat is initiated at an angle $\phi = \phi_o$ and is terminated at the angle $\phi = \phi_1$: the resultant pressure trace would resemble the curve shown in FIG. 3 where the points $\phi_o$ and $\phi_1$ are identified, and for reference purposes, the curve which would result if no heat is added is also shown.

Figure 3:
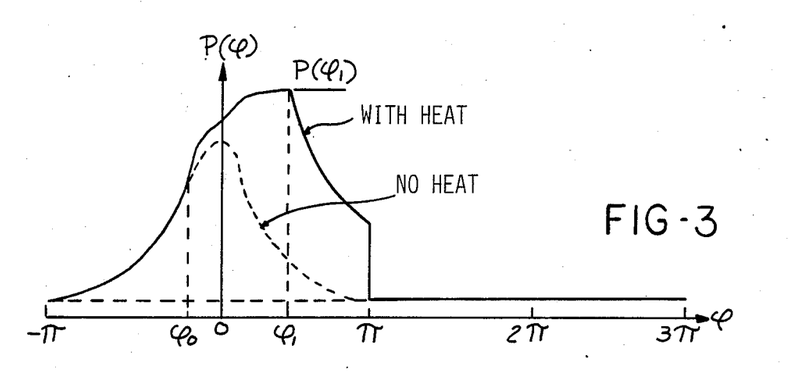
FIG. 3 is plots of pressure-crank angle of a piston engine, with and without heat added.

For the curve shown in FIG. 3, it is to be noted that the functional dependence of P($\phi$) is known for values of $\phi$ between $\phi = -\pi$ and $\phi = \phi_o$, and for values of $\phi$ greater than $\phi_1$ since it is assumed that heat is not released anywhere in either of these ranges. Specifically, for $\phi$ lying between $-\pi$ and $\phi_o$, Equation 1 is satisfied, and for $\phi$ lying between $\phi_1$ and $\pi$, $$P(\phi)V^k(\phi) = P(\phi_1)V^k(\phi_1) \tag{3}$$

where $V(\phi_1)$ is the value of V when $\phi=\phi_1$, and $P(\phi_1)$ is the value of P when $\phi=\phi_1$, i.e., at the end of the period during which heat is released.

To obtain the maximum possible amount of work from the engine for a specified amount of heat added during the cycle, a determination must be made of the values of $\phi_o$ and $\phi_1$, the shape of the $P(\phi)$ curve between $\phi=-\pi$ and $\phi=\pi$, and the rate at which heat must be released between $\phi=\phi_o$ and $\phi=\phi_1$ in order to obtain the desired $P(\phi)$ curve.

As an aid in explaining and describing the technique to be used to make this determination for an actual engine which has various loss factors, a determination will first be made for an engine assumed to have no loss terms.

The work done by the working substance on the piston is given by:

$$W = \int_{-\pi}^{\pi} P(\phi)V'(\phi)d\phi \tag{4}$$

and the total heat added is given by $$Q = \int_{-\pi}^{\pi} q'(\phi)d\phi \tag{5}$$

where $q'(\phi)$ is the rate of heat release given by $$q'(\phi) = \left( \frac{1}{k-1} kP(\phi)V'(\phi) + V(\phi)P'(\phi) \right) \tag{6}$$

The determinations of $\phi_o$, $\phi_1$, $P(\phi)$ and required heat release profile are found by arriving at the unknown function $P(\phi)$ which, when used in conjunction with Equations 5 and 6, yields the specified value Q, and which, when inserted into equation 4, yields the largest possible value for W.

The technique used to find the function $P(\phi)$ is known, by those skilled in the mathematical arts, as Variational Calculus, or, the Calculus of Variations, or, the theory of Euler, as set out in *Methods of Mathematical Physics* by R. Courant and D. Hilbert. Specifically a quantity, $\lambda$, referred to as a Lagrange Multiplier, is introduced in defining a new integral:

$$I = \int_{-\pi}^{\pi} \left\{ P(\phi)V'(\phi) + \lambda \left[ \frac{1}{k-1} \left( kP(\phi)V'(\phi) + V(\phi)P'(\phi) \right) \right] \right\} d\phi = \int_{-\pi}^{\pi} F(\phi, P, P')d\phi \tag{7}$$

According to the theory of Euler, an extreme value (either a maximum or a minimum) of the quantity Q will result if heat is released in such a manner that the resultant function $P(\phi)$ satisfies the so called Euler Equation:

$$\frac{\partial F}{\partial P} = \frac{d}{d\phi}\left[ \frac{\partial F}{\partial P'} \right] \tag{8}$$

Where all loss terms are assumed to be nonexistent, application of Equation 8 to the function F defined by Equation 7 leads to $$(1+\lambda)V'(\phi) = 0 \tag{9}$$

For an arbitary value of $\lambda$, Equation 9 is satisfied only when $$V'(\phi) = 0 \tag{10}$$

and hence, this is the condition at which heat should be released to obtain an extreme (maximum or minimum) value of the quantity W for a specified value of Q.

Referring back to FIG. 2, Equation 10 is satisifed only when $\phi=-90$, $\phi=0$, or $\phi=\pi$. It can be shown that if heat is released at either $\phi=-\phi$ or $\phi=\pi$, the value of W will be zero: these two cases yield minimum values of W and are of no interest. The other possiblility is to release all the heat at $\phi=0$: this is the so called Otto cycle and yields a maximum value of W under the assumed condition of the engine being free of loss terms. Specifically, if all heat is released when $\phi=0$, there results the following well known relationship between the quantities W and Q:

$$\frac{W}{Q} = 1 - \left( \frac{V(0)}{V(\pi)} \right)^{k-1} \tag{11}$$

The technique described above will next be applied to an engine in which various types of losses are known to exist.

Of the various types of losses that are known to exist in an actual reciprocating engine, consider first frictional losses. It is known that the instantaneous friction created within an engine depends on a host of parameters including pressure, crank-angle, geometry, etc. It is also know that such engine friction can be either experimentally determined or mathematically predicted and can furthermore be mathematically related to an equivalent friction torque applied to the shaft of the engine in a direction tending to oppose the motion of the shaft, as described, for example, in SAE paper number 840179, "A New Approach to Evaluate Instantaneous Friction and its Components," by S. F. Rezeka and N. A. Henein. This friction torque is also known to depend instantaneously on pressure, crank-angle, geometry, etc. If this equivalent friction torque is symbolically denoted by $T_f(\phi, P)$, then the energy lost to friction as $\phi$ varies between $-\pi$ and $\pi$ is given by $$E_{friction} = \int_{-\pi}^{\pi} T_f(\phi, P)d\phi \tag{12}$$

In a like manner, it is possible to determine (either by mathematical analysis or experimental techniques) the rate at which heat is transfered from the working fluid to the walls of the combustion chamber, as pointed out, for example, in SAE paper number 841359, "Heat Release Analysis of Engine Pressure Data," by J. A. Gatowski et al. In general, it is known that the rate of heat transfer also depends instantaneously on such quantities as pressure, angle, geometry, etc. If this relationship is known, the total heat transferred to the walls (and hence lost from the working fluid can be obtained through the relationship:

$$Q_{lost} = \int_{-\pi}^{\pi} q'_{lost}(\phi, P)d\phi \tag{13}$$

where $q_{lost}'(\phi, P)$ is a function describing the angular rate at which heat is transferred to the walls.

Similarly, it is possible to account for other loss terms such as the loss resulting from working fluid escaping from the combustion chamber as a result of leaking through valves, between the piston and the cylinder, etc. Such other terms will not be included in what follows as it is not necessary to include them in explaining the technique thus: the work done by the working fluid on the piston is given by Equation (4); the amount of this work which is lost to friction is given by Equation 12; and the net work accomplished is the difference between Equations 4 and 12:

$$W_{net} = \int_{-\pi}^{\pi} [P(\phi)V'(\phi) - T_f(\phi, P)]d\phi \tag{14}$$

According to The First Law of Thermodynamics, the rate at which heat is supplied to the combustion chamber and the rate at which heat is lost from the combustion chamber are related by:

$$q'(\phi, P, P') = \frac{1}{k-1}(kP(\phi)V'(\phi) + V(\phi)P'(\phi1) + q'_{lost}(\phi, P) \tag{15}$$

The total heat supplied during the working stroke is given by Equation 5.

For a given value of Q, the function $P(\phi)$ must be derived, which, when used in conjunction with Equations 15 and 5, yields the desired value Q, and which, when used in Equation 14, yields a maximum value for $W_{net}$.

According to the Calculus of Variations, the following integral is formed:

$$I = \int_{-\pi}^{\pi} \left\{ [P(\phi)V'(\phi) - T_f(\phi, P)] + \lambda \left[ \frac{1}{k-1}(kP(\phi)V'(\phi) + V(\phi)P'(\phi)) + q'_{lost}(\phi, P) \right] \right\} \tag{16}$$

$$= \int_{-\pi}^{\pi} F(\phi, P, P')d\phi$$

According to the theory of Euler set out in *Methods of Mathematical Physics* by R. Courant and D. Hilbert, the following equation $$\frac{\partial F}{\partial P} = \frac{d}{d\phi}\left[\frac{\partial F}{\partial P'}\right] \tag{17}$$

is solved for $P(\phi)$, and this solution is denoted by $P_E(\phi, \lambda)$ since it depends on the assumed value of $\lambda$. This function is shown for a typical reciprocating piston engine in FIG. 4, together with the pressure trace which would result if no fuel were combusted during the working stroke: this latter pressure trace is labeled $P_{motor}(\phi)$.

Figure 4:
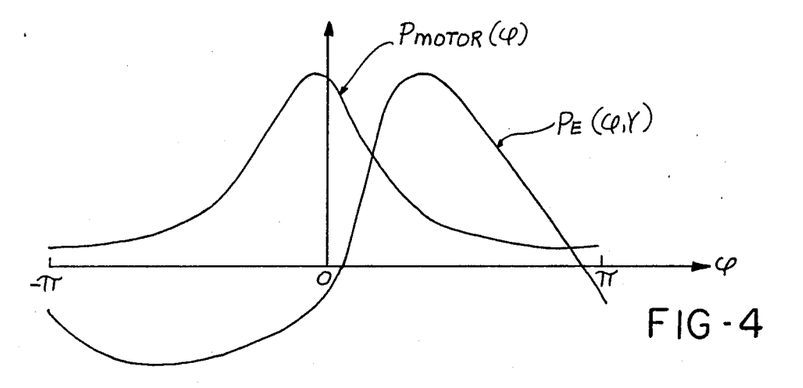
FIG. 4 is plots of pressure-crank angle of a typical piston engine without combustion, and of the same engine with a theoretically derived pressure-crank angle plot.

Further according to the theroy of Euler, the desired pressure trace which leads to a maximum in the net work done by the engine for a specified value of Q is obtained by proceeding as follows:

1. Starting at $\phi = -\pi$ and proceeding toward $\phi = \pi$, compare $P_{motor}(\phi)$ to $P_E(\phi, \lambda)$ for an assumed value of $\lambda$.

2. If $P_E(\phi, \lambda)$ is less than $P_{motor}(\phi)$, the desired value is $P(\phi, \lambda) = P_{motor}(\phi)$.

3. The point at which $P_E(\phi, \lambda)$ is exactly equal to $P_{motor}(\phi)$ determines the value $\phi_o$, the point at which heat is to start being released for the assumed value of $\lambda$.

4. If $P_E(\phi, \lambda)$ is greater than $P_{motor}(\phi)$, the desired value is $P(\phi, \lambda) = P_E(\phi, \lambda)$, and the rate at which heat must be released in order to accomplish this is found by using $P(\phi, \lambda)$ in Equation 15.

5. Step 4 above is continued until a value of $\phi$ is found for which Equation 5 is satisfied: this determines the point $\phi_1$, beyond which no additional heat is to be added.

Figure 5:
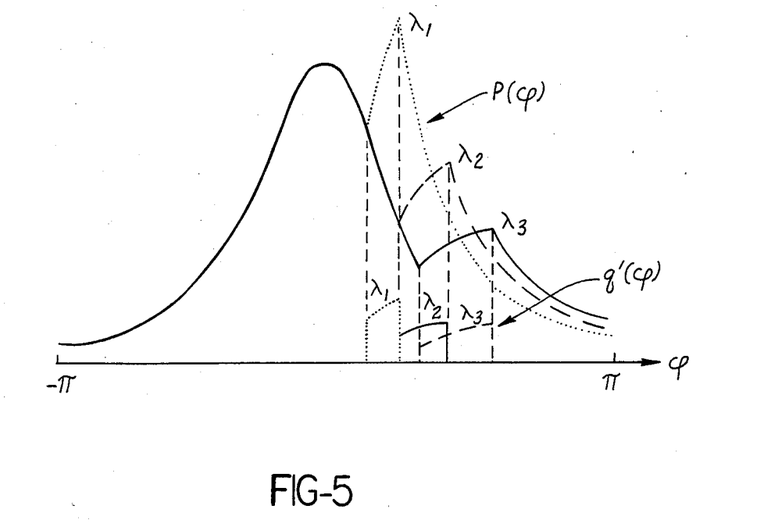
FIG. 5 is the pressure-crank angle plots, derived by analysis of FIG. 4, which lead to maximum efficiency, together with plots of the heat input rate and timing necessary to achieve the maximized engine efficiency.

6. Beyond $\phi_1$, $q'(\phi, P, P')=0$, and the curve $P(\phi, \lambda)$ is found by setting the right hand side of equation 15 to zero and solving for $P(\phi, \lambda)$ by well known mathematical techniques. The result of this procedure as applied to a typical reciprocating piston engine is shown in FIG. 5, where the rates of heat release and subsequent pressure traces are displayed for a complete working cycle between $-\pi$ and $\pi$ for a particular value of Q and for several values of $\lambda$ referred to as $\lambda_1$, $\lambda_2$, and $\lambda_3$.

7. For a particular value of $\lambda$, $P(\phi, \lambda)$ is next used in Equation 14 to determine $W_{net}$ for that value of $\lambda$.

8. The optimum value of $\lambda$, and hence the optimum functions $P(\phi, \lambda)$ and $q'(\phi, \lambda)$ is that value of $\lambda$ which yields the largest value for $W_{net}$.

Figure 6:
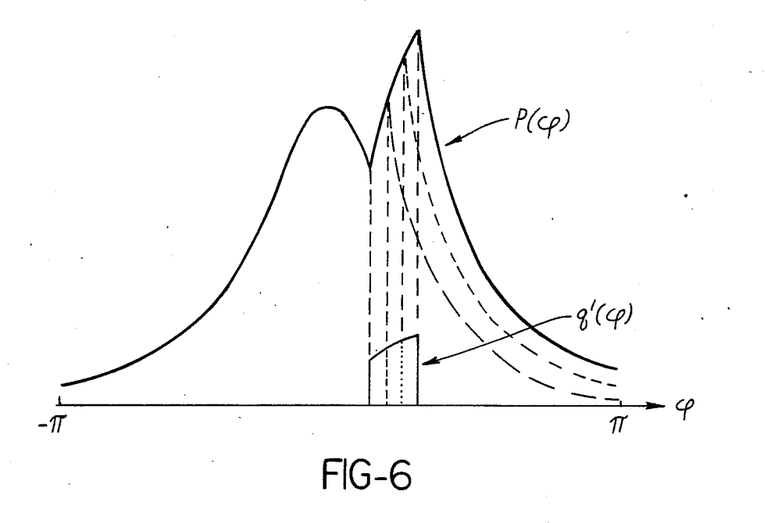
FIG. 6 is plots of optimum pressures and heat input rates for various values of Q.

It has been found upon applying the procedure outlined above to representative reciprocating engines, the optimum value of $\lambda$ is $-0.5$ for all values of Q. FIG. 6 shows optimum rates of heat release and subsequent pressure traces for various values of Q with $\lambda = -0.5$.

It will be observed that for maximized net work output for a specified value of Q, the pressure trace thus derived should equal $P_{motor}(\phi)$ for a significant interval after top dead center. Heat input should not be initiated until this point is reached, and should subsequently be added over a significant interval, peaking at the end of the combustion interval.

This is contrary to conventional wisdom which holds that the heat should be added more or less instantaneously at top dead center as in the Otto cycle.

As developed in detail in the above references, various methods may be employed to "activate" the fuel in order to practice the present invention. The method using partial catalytic combustion is preferred and is herein described as a specific embodiment of the invention.

Partial catalytic combustion may be generally applicable to liquid hydrocarbon fuel such as gasoline, diesel fuel, and light fuel oil without the production of coke. This is described in detail in the above cited references by operation at appropriate air-to-fuel ratios to produce a product gas rich in fuel radicals and hydrogen. Such partial oxidation can be employed with catalytic beds of designs as described therein, which may be operated for many hours without a significant reduction in catalytic efficiency. For example, an air-to-fuel ratio of 5.2 may be employed when using diesel fuel and which generates product gas at a reaction temperature in excess of 1000° C. greatly exceeding the 1000° F. temperature required for hypergolic combusion.

The product gas must be maintained at a temperature sufficiently elevated to enable hyperbolic combustion, i.e., a temperature on the order of 1000° F. or higher long enough to accomplish introduction into the combustion chamber of a combustion device which combustion chamber contains an oxidizing atmosphere such as to produce substantially instantaneous ignition and complete combustion.

Figure 7:
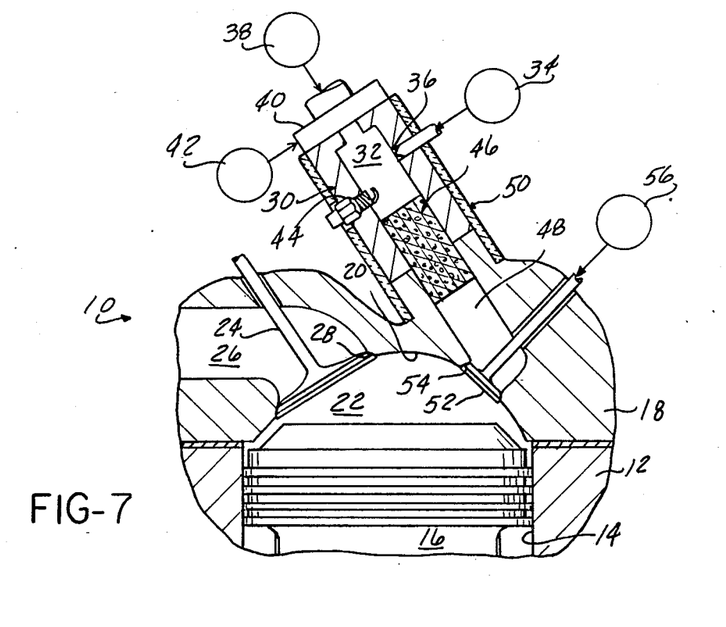
FIG. 7 is a partially sectional view of a piston engine together with diagrammetic associated components necessary to practice the controlled heat release of the present invention.

Referring to FIG. 7, an arrangement is shown for accomplishing such partial catalytic combustion in the context of an internal combustion engine 10, which includes an engine block 12 formed with a cylinder bore 14 and having a reciprocating piston 16 disposed therein. A cylinder head 18 is formed with inner surfaces 20 which together with the piston 16 and bore 14 define a combustion chamber 22. Intake valve 24 is disposed such as to be seated on valve seat 28 and to control communication of an intake air passage 26 with the combustion chamber 22. A similar exhaust valve, valve seat and exhaust passage (not shown) are also provided to enable the products of combustion to be removed from the combustion chamber 22.

A gasifier housing 30 is provided which defines a gasifier chamber 32 into which is injected fuel from a fuel source 34 as via a nozzle 36. The fuel source 34 may also include means for preheating the fuel as by means of an exhaust system heat exchanger as described in the above referenced co-pending patent applications.

Also provided is a source 38 of gasifier air which provides air under pressure into gasifier chamber 32 with valving means 40 operated by a air inlet valve operator 42 provided to form a much richer than stoichometric fuel-air mixture of the proportions as described in the above article references in the chamber 32.

An ignition device, such as spark plug 44, may be disposed in a prechamber 32 to initiate partial combustion during start-up as the fuel-air mixture passes over catalytic bed 46 to complete a partial catalytic combustion and to form a high temperature product gas in an intake chamber 48 downstream of the catalytic bed 46. As noted the various parameters should be controlled to produce a temperature of product gas in excess of 1000° F. to reach the critical proportion of dissassociated fuel molecule radicals sufficient to insure hypergolic combustion.

Depending on the temperature conditions reached in the partial combustion reaction, a suitable insulating jacket 50 may also be provided surrounding the prechamber 32 and catalytic bed 46 if necessary to insure that the product gases achieve the appropriate elevated temperature and maintain such temperature as the fuel is injected into the combustion chamber 22. Such injection is accomplished under the control of fuel intake valve 52 seating on the valve seat 54 controlling communication of the fuel intake chamber 48 with the combustion chamber 22. A suitable valve actuator 56 controls introduction of the high pressure, high temperature product gas in the intake chamber 48 with the combustion chamber 22.

A suitably controlled valve operator 56 for fuel intake valve 52 enables control over the injection event and due to the hypergolic nature of the combustion, also enables control of the combustion event such that maximized engine efficiency can be achieved according to the concept of the present invention.

While the present invention has been disclosed in the context of a reciprocating piston internal combustion engine, it should be understood that the concept is applicable to other expansible chamber engines, such as rotary engines utilizing a rotary element defining in part a combustion chamber and cyclically movable to a position of minimum combustion chamber volume to thereby cause compression of a working fluid in a chamber, and wherein heat is added during each engine cycle while the working fluid is under compression.

What is claimed is:

1. An improved expansible chamber heat engine of the type having cyclical compression and expansion of fluid introduced into a chamber during each engine cycle, said compression and expansion of said fluid caused by cyclical movement of a movable element defining in part said chamber, said movable element reaching a position during each engine cycle corresponding to minimum chamber volume to cause said compression of said fluid therein and means for causing an addition of heat to said fluid during each engine cycle while said fluid is compressed in said chamber, the improvement comprising means for initiating the addition of said heat at a point substantially later in said cycle after said movable element reaches said position of minimum chamber volume.

2. An improved expansible chamber internal combustion engine of the type having a movable element defining in part a combustion chamber and cyclically reaching a position of minimum combustion chamber volume, an air intake system for introducing a quantity of air during each engine cycle, and fuel delivery means for introducing a quantity of fuel into said combustion chamber during each engine cycle, the improvement comprising:

fuel activation means for activating each quantity of fuel delivered by said fuel delivery means to enable hypergolic combustion thereof upon introduction into said combustion chamber;

and fuel delivery control means initiating fuel introduction during each cycle at a time significantly later than the time at which said movable element reaches said position of minimum combustion chamber volume.

3. The engine according to claim 2 wherein said engine is a reciprocating piston type having a piston cyclically reaching a top dead center position whereat said combustion chamber volume is at a minimum; and wherein said fuel is intorduced during each engine cycle a substantial interval after said piston reaches said top dead center position.

4. The engine according to claim 2 wherein said fuel delivery control means causes continued introduction of said fuel over a significant time interval after initiation of fuel introduction.

5. The engine according to claim 4 wherein said fuel delivery control means causes fuel introduction at a rate to cause an increase in combustion chamber pressure, peaking at the end of said introduction.

6. A method of maximizing work output from each quantity of fuel burned in an oxidizing atmosphere in a combustion chamber of an internal combustion engine having cyclical combustion episodes therein comprising the steps of:

determining the rate and timing of heat input into said combustion chamber required to maximize work output from said engine for a given total heat input for each combustion episode including the steps of deriving functions describing heat input and of loss factors affecting the work output, and analyzing said functions utilizing calculus of variations to arrive at a function describing optimal heat release to achieve maximum net efficiency.

7. The method according to claim 6 wherein an optimal combustion chamber pressure-time function is derived by said step utilizing calculus of variations and analyzed with respect to a pressure-time function of said engine without combustion to determine said rate and timing of heat release to achieve maximum work output for each quantity of fuel introduced into said combustion chamber.

8. The method according to claim 6 wherein said engine is a reciprocating piston engine, and in said step of determining said required rate and timing of heat input, includes the step of deriving one or more work loss factor functions related to piston position and analyzing the effect of one or more loss factor functions on said rate and timing of heat input.

9. The method according to claim 8 wherein said loss factors include friction and heat loss occurring during each combustion episode and related to piston position.

10. The method according to claim 9 wherein introduction of each quantity of said fuel into said combustion chamber is initiated substantially after said piston has reached top dead center.

11. In an internal combustion piston engine of the type undergoing cyclical combustion cycles and including a combustion chamber, air intake means for introducing a charge of air into said combustion chamber during each combustion cycle, and fuel delivery means for introducing a charge of fuel into said combustion chamber during each combustion cycle, the improvement comprising:

fuel pretreatment means for activation of each quantity of fuel to enable hypergolic combustion of said fuel upon introduction into said combustion chamber by said fuel delivery means; and control means controlling the rate and timing of introduction of said activated fuel into said combustion chamber by said fuel delivery means at a rate and timing of fuel introduction functionally related to one or more loss factors of said engine comprising friction and heat loss related to piston position during each combustion cycle;

said control means initiating introduction of each quantity of activated fuel after said piston has passed top dead center, and continues over a substantial time interval to cause an increase in combustion chamber pressure peaking at the end of said introduction.

* * * * *

UNITED STATES PATENT AND TRADEMARK OFFICE
CERTIFICATE OF CORRECTION

PATENT NO. : 4,691,682

DATED : September 8, 1987

INVENTOR(S) : Lyle O. Hoppie

It is certified that error appears in the above-identified patent and that said Letters Patent is hereby corrected as shown below:

Column 1, line 42, "of" should be --at--.

Column 1, line 45, "values" should be --valves--.

Column 1, line 56, "compression-heated" should be --compression-ignited--.

Column 2, line 4, "of Ignition" should be --on Ignition--.

Column 2, line 9, "dissassociated" should be --disassociated--.

Column 2, line 11, "dissassociated" should be --disassociated--.

Column 2, line 17, "dissassociation" should be --disassociation--.

Column 2, line 22, "dissassociation" should be --disassociation--.

Column 2, line 28, "dissassociated" should be --disassociated--.

Column 2, line 31, "dissassociated" should be --disassociated--.

Column 2, line 36, "dissassociated" should be --disassociated--.

Column 4, line 21, "diagrammetic" should be --diagrammatic--.

Column 5, line 67, "quantity Q" should be --quantity W--.

Column 6, line 22, "$\phi = -90$" should be --$\phi = -\pi$--.

Column 7, line 6, "fluid" should be --fluid)--.

Column 7, line 55, after "$\}$" should be --$d\phi$--.

UNITED STATES PATENT AND TRADEMARK OFFICE
CERTIFICATE OF CORRECTION

PATENT NO. : 4,691,682

DATED     : September 8, 1987

INVENTOR(S) : Lyle O. Hoppie

It is certified that error appears in the above-identified patent and that said Letters Patent is hereby corrected as shown below:

Column 8, line 8, "theroy" should be --theory--.

Column 9, line 7, "combusion" should be --combustion--.

Column 9, line 38, "a" should be --an--.

Column 9, line 51, "dissassociated" should be --disassociated--.

Column 10, line 55 (Claim 3), "intorduced" should be --introduced--.

Signed and Sealed this

Twenty-ninth Day of March, 1988

Attest:

DONALD J. QUIGG

*Attesting Officer*       *Commissioner of Patents and Trademarks*